Feb. 6, 1940.　　　C. E. BRIDWELL　　　2,189,129
VALVE
Filed March 9, 1937　　　3 Sheets-Sheet 3
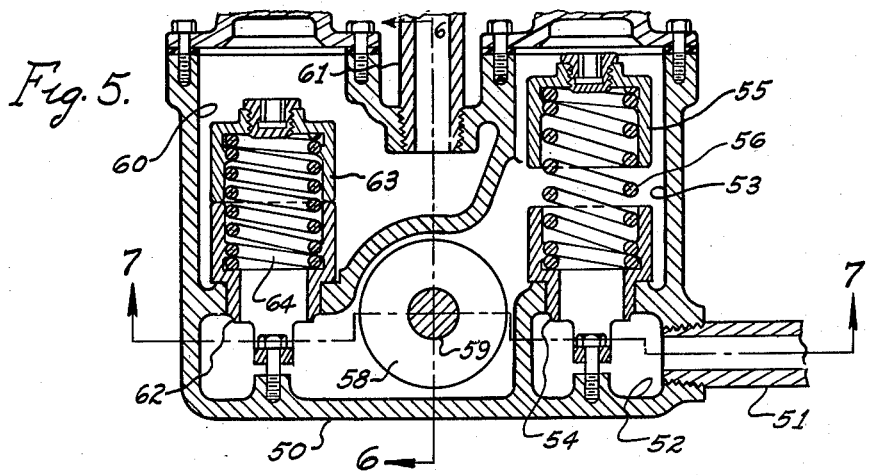
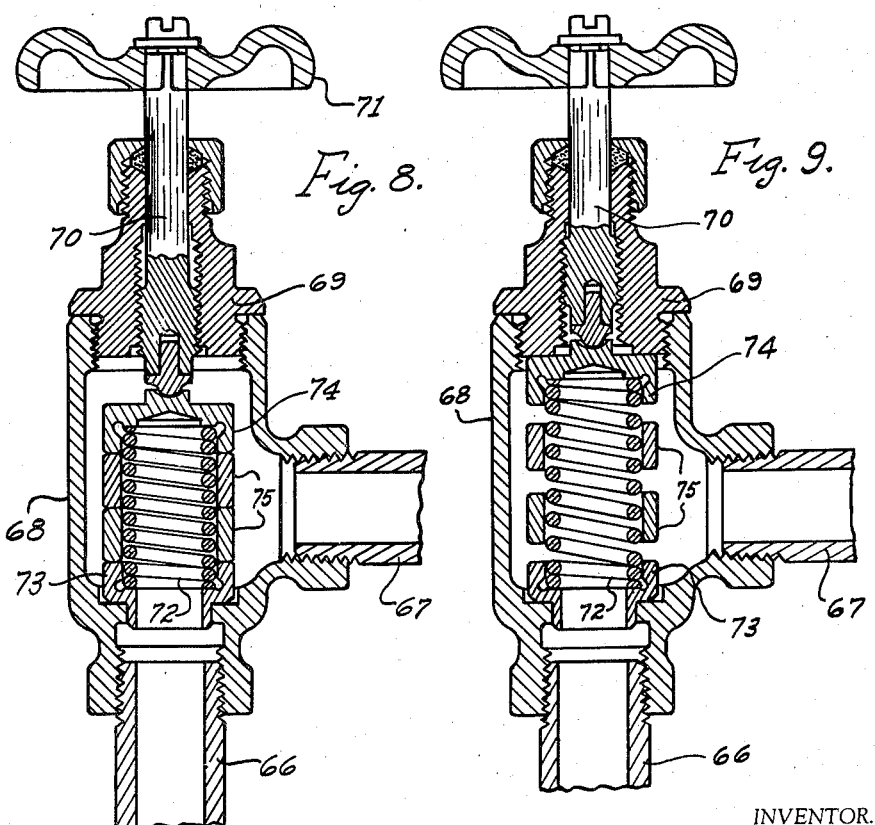
INVENTOR.
Chalon E. Bridwell
BY
ATTORNEY.

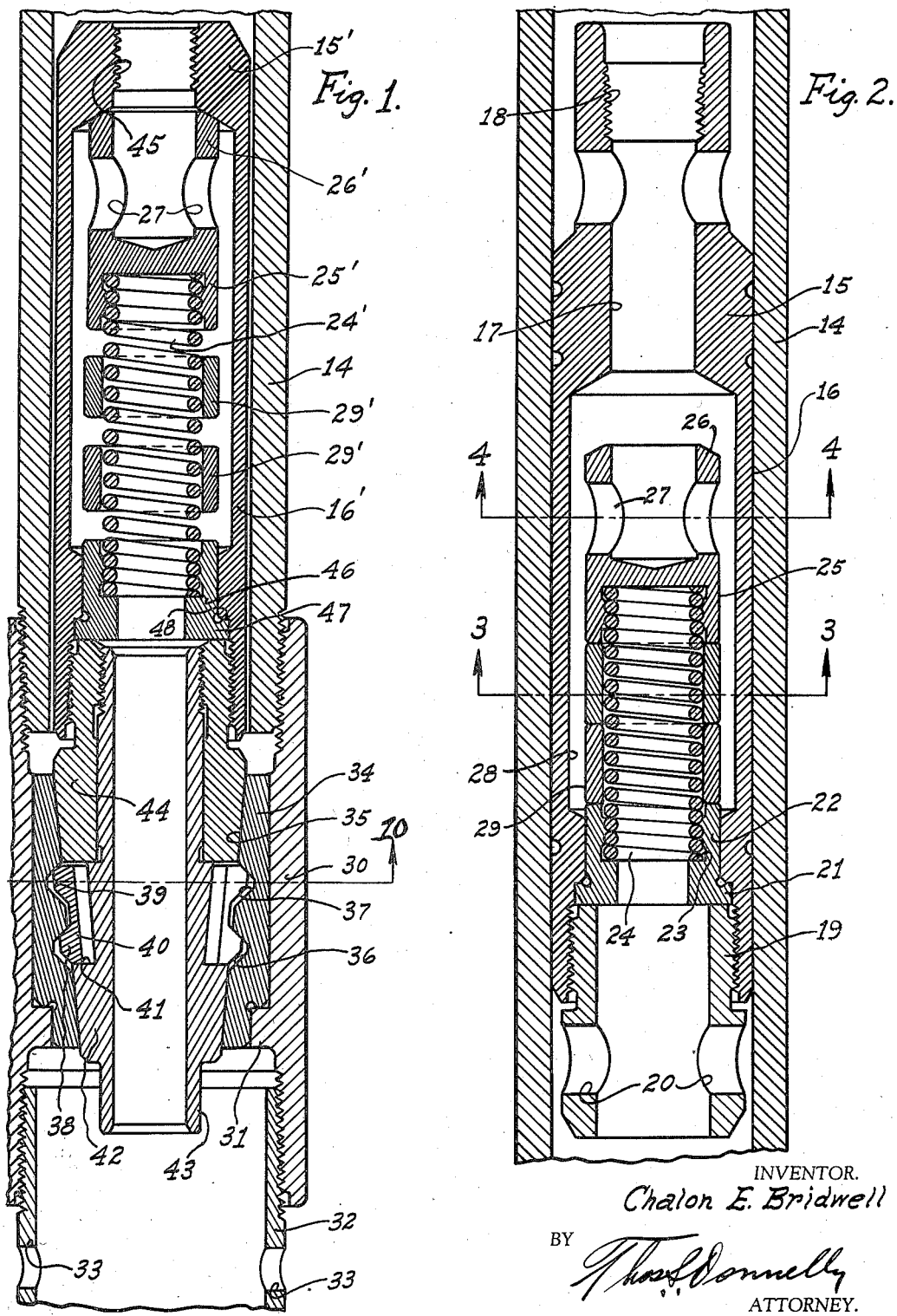

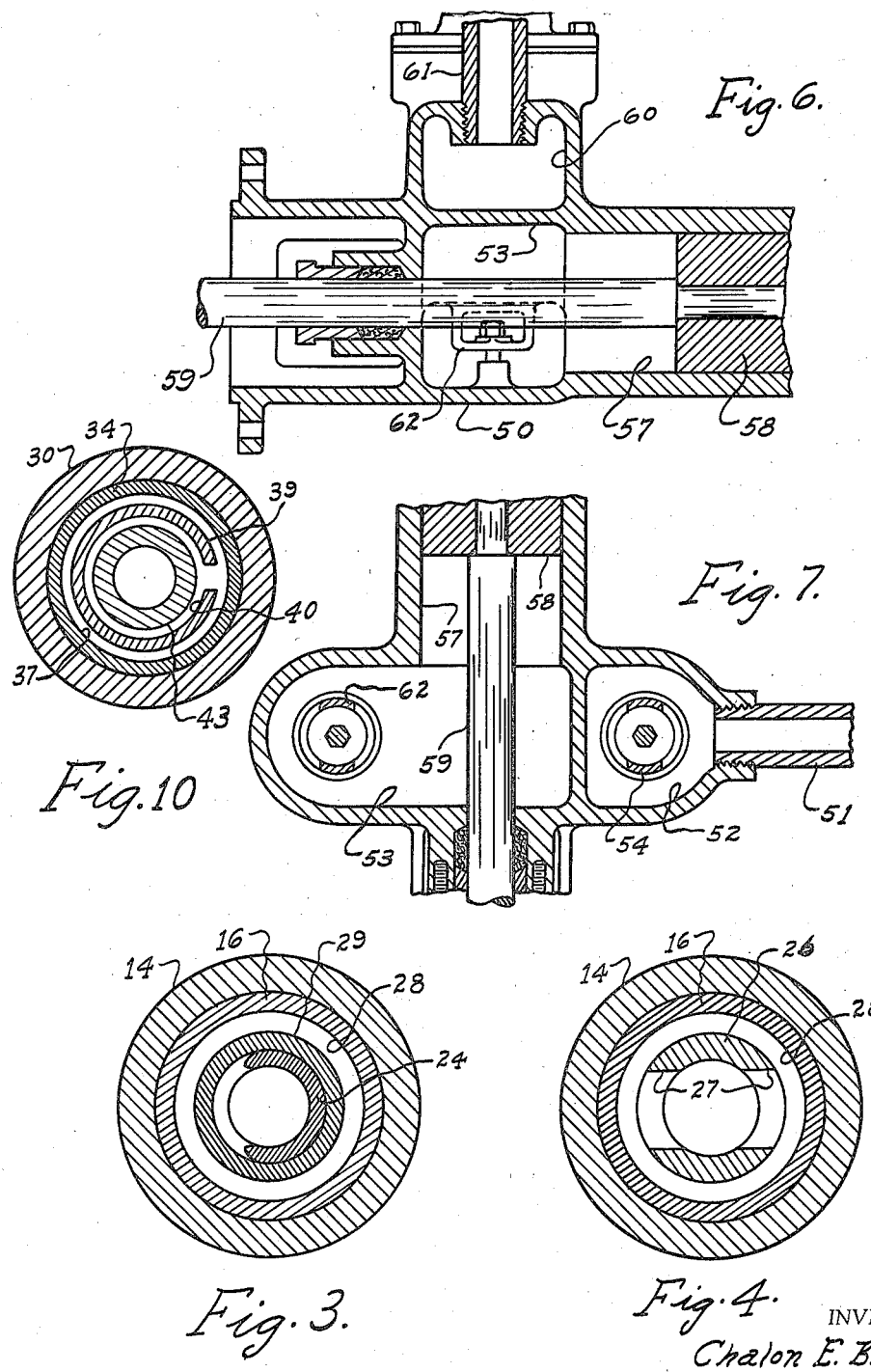

Patented Feb. 6, 1940

2,189,129

UNITED STATES PATENT OFFICE 2,189,129

VALVE

Chalon E. Bridwell, Detroit, Mich.

Application March 9, 1937, Serial No. 129,912

2 Claims. (Cl. 251—114)

My invention relates to a new and useful improvement in a valve mechanism normally held by a spring in closed position and adapted upon overcoming of the spring compression or tension for being moved to open position. The invention lends itself for use in various types of valve mechanisms and is particularly adapted for use under conditions where liquid under pressure may be encountered under such conditions that the pressure will force the valve into open position and also force the valve into closed position alternately.

It is an object of the present invention to provide a valve so constructed and arranged that a maximum of efficiency, durability, simplicity of structure and economy of manufacture may be obtained.

It is another object of the present invention to provide a valve mechanism having a spring cooperating with annular members and in which there is an embracing relation between the spring and the annular members, the annular members being so arranged that when the spring is in compressed condition they will be moved into contact with each other and serve as a closure.

Other objects will appear hereinafter.

The invention consists in the combination and arrangement of parts hereinafter described and claimed.

The invention will be best understood by a reference to the accompanying drawings which form a part of this specification and in which:

Fig. 1 is a longitudinal, central, sectional view of the invention showing it applied to an oil well.

Fig. 2 is a longitudinal, sectional view of the invention showing the valve constructed for use with a sucker rod.

Fig. 3 is a sectional view taken on line 3—3 of Fig. 2.

Fig. 4 is a sectional view taken on line 4—4 of Fig. 2.

Fig. 5 is a central, sectional view of a pump showing the invention in use.

Fig. 6 is a sectional view taken on line 6—6 of Fig. 5.

Fig. 7 is a sectional view taken on line 7—7 of Fig. 5.

Fig. 8 is a central, sectional view of a valve in closed position showing the invention in use.

Fig. 9 is a view similar to Fig. 8 showing the valve in open position.

Fig. 10 is a sectional view taken on line 10—10 of Fig. 1.

While the invention may be used with various types of valves, it is particularly adapted for use in connection with the pumping operations carried on in an oil well. In Fig. 2 I have shown the invention mounted in a working barrel 14. Snugly engaging in this working barrel and slidable therein is a plunger embodying the upper crown 15 which is mounted on one end of the tubular portion 16 and through which is extended the passage 17 the upper end of which is threaded as at 18 for the reception of the sucker rod which is not shown. Threaded on to the lower end of the tubular portion 16 is the lower crown 19 which is hollow and provided with the lateral openings 20. This crown 19 is threaded against the flange 21 formed on the sleeve 22 which is provided with the internal shoulder 23 against which one end of the spring 24 engages, this end of the spring 24 being securely attached to the member 22. The other end of the spring is fitted in the cup-shaped member 25 to which it is securely attached. This cup-shaped member carries the tubular projection 26 having the lateral openings 27 formed therein. It will be noted that there is a space 28 within the tubular member 16 around the member 25, the member 25 being of less outside diameter than the inside diameter of the member 16. Embracing the spring 24 are the annular members, rings or collars 29. The end faces of the rings or collars 29, and likewise, the faces of the members 22 and 25 are ground or lapped to a high polished finish so that when a pair of these faces so ground are brought into engagement, they seat against each other with a sealing contact. The same is also true of the end faces of 29', 25', and 46, shown in Fig. 1 and of the members 55 and 54, 62 and 63, shown in Fig. 5, and of the collars 75, and of the members 73 and 74 shown in Fig. 8. In the form shown in Fig. 1 and Fig. 2, these parts, when brought into the position shown in Fig. 2, are always concentric relatively to each other, so that there is a proper seating engagement between the faces. This precision of engagement is assisted by the spring member. This would be true also whether the members 29, 22 and 25 embrace the spring or whether these members were embraced by the spring. The end face of one of the endmost annular members engages the inner face of the member 22. When the parts are assembled, the spring is stretched slightly. When the parts are in the position shown in Fig. 2, so that the various parts are in contact with each other to effect the desired seal so as to close communication between the space 28 and the interior of the crown 19, the spring is under tension. Thus, as the parts which engage against each other, wear at the contacting faces, the wear will ordinarily be taken up by the lessening of the tension to which the spring is subjected. This spring, of course, is of sufficient strength to maintain these parts, when the valve is in closed position, in such close contact as to effect the desired seal. Another feature of the invention which has been noticed when fluid containing sand or grit is being pumped through is that the sand or grit in the fluid which engages between the contacting serves as a grinding compound to constantly keep the faces in proper condition for seating against each other in sealing relation.

In Fig. 1, I have illustrated the invention used with a stationary valve which is intended to cooperate with the mechanism shown in Fig. 2. As shown in Fig. 1, the working barrel 14 is threaded onto an extension 30 which is provided intermediate its ends with the inwardly projecting shoulder-forming flange 31. The lower end of the extension 30 is threaded onto a casing extension 32 having the lateral openings 33 formed therein. Positioned in the extension 30 is the sleeve 34 having the tapered inner surface 35 and provided with tapered inner curves 36 and 37 in which engage the annular ribs or beads 38 and 39 projecting outwardly from the ring 40. This ring, 40, which is a split ring, rests upon the shoulder 41 formed on the tapered body 42 carried by the tube 43 which is positioned in the member 34. This tapered surface 35, is a finely ground surface, as is likewise the outer surface of the tapered body 42, so that when the body 42 is dropped into the sleeve 34 these tapered surfaces will engage each other in a sealing contact. The upper end of the tube 43 is threaded and threaded onto this threaded portion is a lock sleeve 44 which is threaded on its periphery at its upper end and threads into the lower end of the tubular body 16' depending from the upper crown 15.' The lock sleeve 44 is provided with a tapered peripheral surface which is ground to a high degree of polish and which is adapted to engage the tapered surface 35 so that when the tapered surface of the member 44 engages in the surface 35, a sealing engagement contact is effected. This upper crown 15' is provided with the threaded passage 45 into which a rod may be threaded when desired. Ordinarily, a rod would be threaded into the passage 45 only when it is desired to remove the valve assembly. The upper end of the member 44 engages the collar 46 and presses its peripheral flange 47 against the inwardly projecting shoulder 48 formed on the member 16'. This member 46 is provided with a recess in which one end of the spring 24' engages. This end of the spring is securely attached to the member 46. The upper end of the spring is attached to a body 25' corresponding to the body 25 and provided with the upward extension 26' having the lateral openings 27' formed therein. Embracing these springs are annular members, rings or collars 29' corresponding to the members 29 explained Fig. 2. The ground faces are provided on the members 25', 46 and the annular members 29' so that when these parts are moved to engaging position a sealing engagement will be effected.

A function of the ring is to lock the sleeve 43 in position after it is inserted. This split ring 40 will snap into position to maintain the ribs or beads 38 and 39 in engagement in the grooves 36 and 37. The ring itself engaging the shoulder 41 will resist a withdrawal of the tube 43 from the member 34, under normal pumping conditions. The tapered faces of the grooves 36 and 37 cooperating with the tapered surfaces of the ribs or beads 38 and 39 will permit a withdrawal of the mechanism when a disassembly of the parts is desired and sufficient upward pressure is asserted on the member 43.

In operation the valve mechanism shown in Fig. 1 would be mounted at the bottom of the working barrel or casing and the mechanism shown in Fig. 2, which constitutes the travelling valve, would be reciprocated by the sucker rod. When used for pumping an oil well, as the travelling valve shown in Fig. 2 would be moved downwardly toward the standing valve shown in Fig. 1, the upward pressure on the spring 24', shown in Fig. 1 would be relieved and the annular members 29' would be clamped between the member 46 and the member 25' to provide a closed sealing connection. As the movement of the travelling valve continues the liquid positioned above the standing valve and below the travelling valve would pass upwardly through the crown 19 into the interior of the spring and outwardly thereof into the interior of the tubular member 16 between the coils of the spring which would be slightly spread apart, the member 25 being forced upwardly so as to stretch the spring 24 and place the assembled parts in substantially the position that the corresponding parts are shown in Fig. 1. On the upward stroke of the travelling valve the the parts 22, 29, and 25, would move into the position shown in Fig. 2 and the oil below the standing valve would pass upwardly through the tubular member 43 outwardly into the tubular member 16', the parts 46, 29', and 25' being moved into the position shown in Fig. 1. Consequently, it is seen that the valve mechanism consists of the spring and its cooperating parts, namely: the member 22, the annular members 29 and the member 25 in Fig. 2 and the corresponding parts in Fig. 1. Experience has shown that a very efficient, easily operating valve of long life is thus provided. Thus the invention, because of its long life, is especially adapted for use in pumping oil wells, as the necessity of removing the valve from the oil wells is reduced to a minimum.

In Figs. 5, 6, and 7, I have shown the invention adapted for use on a pump. The pump illustrated comprises a housing 50 having an inlet pipe 51 communicating with a chamber 52. This chamber communicates with a chamber 53 through the hollow valve section 54. This hollow valve section cooperates with a cup-shaped valve section 55 into which is projected and secured one end of a spring 56. The other end of the spring 56 is secured to the member 54 and the faces of the members 55 and 54 are adapted to engage and are ground so that when in engagement they will form an intimate contact of a sealing nature. When assembled the spring is under such conditions as to normally tend to retain the parts 54 and 55 in engagement with each other.

This pump is of the reciprocating type and leading from the chamber 53 is a cylinder 57 in which is slidably mounted the piston 58 reciprocated by the reciprocating rod 59. When the piston 58 is reciprocated in one direction it will draw liquid through the pipe 51 and this liquid will force the valve sections 55 and 54 into the position shown in Fig. 5. When the piston 58 is moved in the opposite direction the valve sections 54 and 55 will move into engagement with each other and thus close the communication between the pipe 51 and the chamber 53. This chamber 53 is adapted for communicating with the chamber 60, from which leads the outlet pipe 61, through the valve section 62 which is designed to cooperate with the valve section 63. The meeting faces of these valve sections 62 and 63 are finely ground to afford the necessary sealing contact. A spring 64 is connected at one end to the member 62 and at the opposite end to the member 63 and serves to normally retain the valve sections in contact with each other. When the piston moves in the direction to expel the liquid from the chamber 53 and the valve sections 54 and 55 have moved to closed position the pressure of the liquid will force the valve sections 62 and 63 to separate and permit the passage of the liquid into the chamber or compartment 60. Experience has shown that when this valve is used for this purpose a very effective valve operation is obtained.

I have illustrated the invention also used with a manually opened and closed valve as illustrated in Fig. 8 and Fig. 9. In this form of construction an inlet pipe 66 and an outlet pipe 67 communicate with the valve housing 68 carrying the cap 69 through which is threaded a longitudinally movable operating stem 70 on which is mounted the hand grid 71. A spring 72 is secured at one end to the fixedly mounted ring 73, the opposite end of the spring 72 being fixedly attached to the cup-shaped member 74. The sealing rings or annular members 75 embrace the spring 72, and in this construction the spring, when assembled, is under such conditions as to normally retain the valve in open position as shown in Fig. 9. When the stem 70 is threaded downwardly as shown in Fig. 8 the valve may be moved to closed position.

In all of the forms illustrated the sealing members or rings are shown as frictionally embracing the spring but it is obvious that the same results could be obtained were the spring itself to frictionally embrace the sealing members. It should be noted that the sealing members which contact each other are carried by a yieldable member which serves as a guide by returning these contact members into properly aligned contacting position after the separation or movement into non-engaging position, and it will also be noted that this carried member which serves as a guide for the contact members is flexible and yet of sufficient strength and resiliency to normally tend to maintain the various contacting parts concentric with each other. This would serve to prevent the parts moving to undesirable lateral positions so that the members 25 and 25' swinging sidewise so as to rub against the inner surface of the members 16 and 16' is resisted and normally prevented. It will also be noted that the coils of the spring, when the valve is moved to closing position such as shown in Fig. 2, will serve as an auxiliary seal. With the spring, under tension, when the parts are in the position shown in Fig. 2 so as to maintain the contacting or sealing parts in proper engagement, experience has shown that the separation of the coils resulting from placing the spring under such a tension is so negligible that the coils themselves do serve as auxiliary sealing means. Of course, the degree of separation of the coils for the purposes of obtaining the necessary constant tension on the contacting parts when the valve is in closing position would depend upon the strength of the spring used. Because of the frictional engagement between the sealing collars and the coils of the springs of the forms shown in Figures 1 and 8, the said collars are caused to separate as the device is opened.

While I have illustrated and described the preferred form of construction I do not wish to limit myself to the specific type of construction shown but desire to avail myself of such variations and modifications as may come within the scope of the appended claims.

Having thus described my invention, what I claim as new, and desire to secure by Letters Patent is:

1. A valve mechanism adapted for being interposed in a fluid conduit and controlling the flow of fluid through said conduit, comprising: a tubular coil spring fixed at one end in alignment with the conduit; a plurality of separate annular sealing members arranged relatively to said spring in embracing relation and in frictional engagement therewith, said sealing members engaging each other in sealing relation upon the closing of said spring and moving into separated relation upon the spreading of said spring, said sealing members engaging each other at their adjacent ends; means at one end of said spring for engaging the outer end of one of the endmost of said sealing members in sealing relation; and means at the other end of said spring for engaging the outer end of the other endmost sealing member in sealing relation upon the closing of said spring, said spring being normally under tension for normally maintaining said sealing members in sealing engagement with each other.

2. A valve mechanism adapted for being interposed in a fluid conduit and controlling the flow of fluid through said conduit, comprising: a housing adapted to be interposed in said conduit, having an inlet port for communication between said housing and said conduit and an outlet port for communication between said housing and said conduit; a stationary abutment member mounted in said housing and having an opening formed therethrough communicating with said inlet port and with the interior of said housing; a coil spring secured at one end to said abutment member and positioned in alignment with the opening therethrough; a closure for the opposite end of said spring; and a plurality of annular sealing members mounted relatively to said spring in embracing relation and in frictional engagement therewith, one of the endmost of said sealing members being engageable with said closure and the other endmost of said sealing members being engageable with said abutment member and clamped against each other and between said abutment member and said closure for forming therewith and with each other a sealing contact upon the closing of said spring, and moving out of engagement with each other and with said closure and said abutment member upon the spreading of said spring, said spring being normally under tension for maintaining said sealing contact.

CHALON E. BRIDWELL.